UNITED STATES PATENT OFFICE.

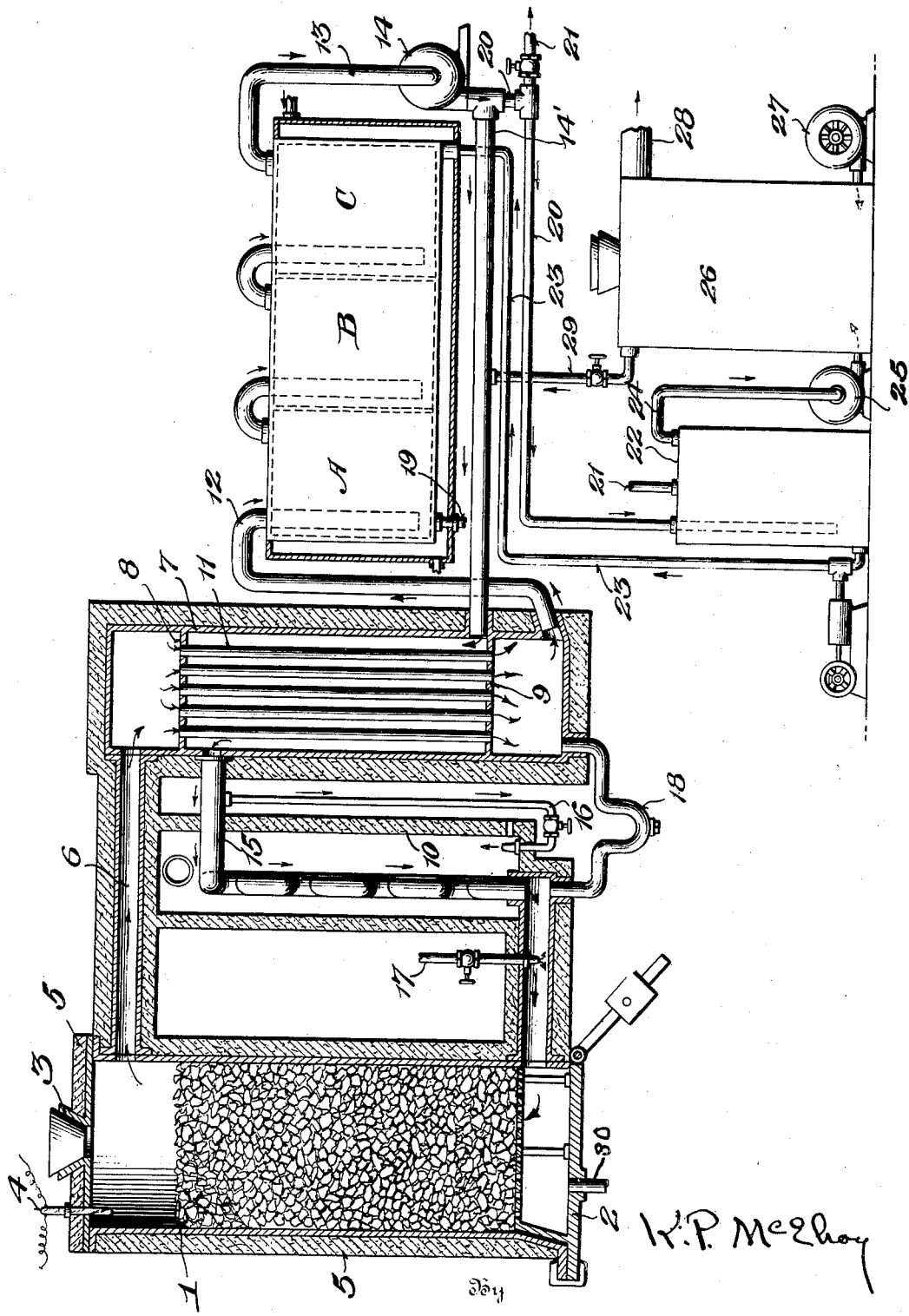

KARL P. McELROY, OF WASHINGTON, DISTRICT OF COLUMBIA, ASSIGNOR TO FERRO CHEMICALS, INC., OF WASHINGTON, DISTRICT OF COLUMBIA, A CORPORATION OF DELAWARE.

FIXATION OF NITROGEN.

1,408,754.   Specification of Letters Patent.   Patented Mar. 7, 1922.

Application filed February 27, 1918, Serial No. 219,486. Renewed July 29, 1921. Serial No. 488,449.

*To all whom it may concern:*

Be it known that I, KARL P. McELROY, a citizen of the United States, residing at Washington, in the District of Columbia, have invented certain new and useful Improvements in Fixation of Nitrogen, of which the following is a specification.

This invention relates to the fixation of nitrogen; and it comprises a method of converting atmospheric nitrogen into useful combined forms wherein the latent or potential energy of carbon monoxid (CO) is utilized in facilitating or accelerating combination, such carbon monoxid being employed to produce highly reactive nascent carbon or nascent hydrogen, or both, in the presence of the nitrogen to be brought into combination; all as more fully hereinafter set forth and as claimed.

As is well recognized, the main obstacle in the way of an economical commercial method of converting atmospheric or "free" nitrogen into combined form lies in the tenacity of union existing between the two atoms of the molecule, $N_2$, of gaseous nitrogen. Not only is the affinity between the two atoms great but they exhibit a sort of passive resistance against dissociation. The difficulty in effecting combination with another element (such as hydrogen) is of course accentuated where the other element is, as is ordinarily the case, also in a molecular state with atoms bound together with a strong affinity and exhibiting resistance to dissociation. In a measure, the two effects are additive; a certain proportion of the difficulty being due to the inertness of the nitrogen and another proportion to the inertness of the other element. In making synthetic ammonia from gaseous hydrogen and gaseous nitrogen, for example, three $H_2$ and one $N_2$ must dissociate in order to form two $NH_3$. In other words, three molecules of hydrogen must be dissociated for every molecule of nitrogen that is dissociated.

As illustrative of the difficulty, may be cited the usual method of making synthetic ammonia from gaseous hydrogen and gaseous nitrogen in which the two gases are passed over a catalyst at a high temperature and under enormous pressure. It is usual to work at a temperature around a red heat (400–500° C.) and at a pressure of the order of 150–200 atmospheres (2250 to 3000 pounds per square inch). Naturally apparatus capable of withstanding these pressures at these temperatures is difficult to design and expensive to build. As the catalyst, most of the metals have been tried. Uranium, iron, osmium, etc., are in use. No catalyst however has been found which is altogether satisfactory; all are more or less erratic in their behavior and for this reason it is considered necessary to employ hydrogen and nitrogen of a high degree of purity to avoid "poisoning the catalyst."

It is an object of the present invention to facilitate and accelerate the union of nitrogen with other bodies by presenting to it such other bodies in a nascent or atomic condition wherein they are of relatively high activity; and to provide a method of forming synthetic ammonia from atmospheric nitrogen not dependent on costly apparatus or necessitating high pressures. In doing this I avail myself of the latent energy of carbon monoxid.

Carbon monoxid is a stable permanent substance under most conditions but nevertheless it may be regarded as potentially unstable; as being able to break up with evolution of energy. This energy is utilized in the present invention. Solid carbon in the form of charcoal, coal and coke burns or oxidizes in two stages. Some 30 per cent of the total heat of combustion is evolved in uniting with one oxygen atom to form carbon monoxid (CO) while the remainder, or 70 per cent, is developed in uniting the monoxid with a second oxygen atom to form carbon dioxid ($CO_2$). Since carbon in an atomic, gaseous state should evolve exactly as much heat, (70 parts) in uniting with the first oxygen as it does in uniting with the second, the deficit, (40 parts), represents heat disappearing or expended in the work of dissociating and gasifying the molecules of the solid carbon. It will be noted that the heat disappearing is greater than the heat evolved in the proportion of 40:30. Presuming one molecule of CO to be oxidized at the expense of a second CO to form $CO_2$ and C, it is evident that there will be an evolution of heat, (40 parts), if the C be deposited in the solid molecular form; or that if the carbon be allowed no opportunity of deposition, being combined with something else at the instant of formation while still in the atomic or nascent state, then the heat of combination, which is a measure of affinity, will be greater than it could be if using solid carbon. Such a rearrangement, or tendency to rearrangement, of CO with development of potential or actual energy can be brought about by many catalysts, among which may be mentioned palladium, platinum, molybdenum, etc. The three metals of the iron group, iron, nickel and cobalt catalyze it; cobalt being particularly active. Alkalies also catalyze the reaction. As it chances, the metals of the iron group are also good catalysts in promoting the fixation of nitrogen.

The converse reaction, the reduction of $CO_2$ by C to produce 2CO of course takes place readily in a gas producer containing a deep bed of highly heated fuel, and is attended with a disappearance or absorption of heat (40 parts). If a gas producer be connected to a chamber containing finely divided cobalt by conduits permitting a cyclic circulation of gases, both reactions may be made to take place in succession or alternation; carbon disappearing and heat being absorbed in the gas producer and carbon being deposited and heat being evolved in the cobalt chamber. Such an arrangement in one way may be considered as a sort of carbon still, carbon being removed from the impure coke or the like in the producer and deposited in pure ash-free form in the cobalt chamber; and in another way may be regarded as an arrangement for abstracting heat from the producer and delivering it as heat or useful energy in the other chamber.

If water vapor be present in admixture with the carbon monoxid in the catalyst chamber, the formation of nascent hydrogen in addition to, or in lieu of, nascent carbon, may occur. The particular result in any case depends on the catalyst, the temperature, the relative proportions of water vapor and monoxid and many other factors; but in a general way, it may be said that of the metals of the iron group iron tends to produce hydrogen rather than carbon while the reverse is true of cobalt. Nickel also tends to produce carbon.

In both reactions, the driving energy is due to the tendency of CO to become $CO_2$, either at the expense of another CO or of $H_2O$, and if $CO_2$ be already present in the gas mixture at the time of reaction, the tendency is diminished in proportion to its concentration; a fact which allows a method of control in the present operation.

In a mixture of carbon monoxid and nitrogen exposed to the action of a catalyst at a temperature of say 300 to 450° C. the nitrogen is exposed to the action of nascent carbon and tends to form a cyanid if possible. If the catalyst is iron, not much carbon is deposited; if it is nickel there is a greater deposition, and a still greater deposition if it is cobalt. Evolution of heat is proportional to the separation of carbon. In the presence of a base capable of forming a cyanid, such as potash, baryta, lithia, thallium oxid, etc., cyanid is produced; but in general to have much formation of cyanid it is necessary to raise the temperature considerably above the range stated. In utilizing the present invention in the production of cyanid to be recovered as such, I find it better to use nickel since its removal from the cyanid is easier than is the case with iron or cobalt, unless the heat is to be raised so high as to distil over the cyanid. If steam be also present in the mixture, the reaction possibilities are much increased since it is now possible to form ammonia and also hydrocyanic acid. Iron favors the formation of hydrogen more than the formation of carbon, and in its presence the formation of ammonia is also favored.

In most embodiments of the present invention I employ a modicum of steam or water vapor in admixture with the carbon monoxid and nitrogen, but where the charge contains enough alkali to form a substantial proportion of cyanid, cyanid formation and steaming may be alternate steps. In so doing, the steam of course merely serves to break up the cyanid. In this latter embodiment of my process, presuming the charge to consist of baryta or potash carrying 10 per cent or so of cobalt, after the steaming operation the charge is exposed to the action of gas carrying nitrogen and carbon monoxid, but as free as may be of carbon dioxid. Carbon is deposited and the charge, which has been somewhat cooled by the steaming, gradually rises in temperature to a point where the deposited carbon, the alkali and nitrogen react to form cyanid under the catalytic effect of the cobalt. When a sufficient amount of cyanid is formed, steaming is again resorted to, and so on. The alkali charge may be used indefinitely which is of course not true in certain methods where the carbon is furnished to the alkali by periodical admixture with ordinary coke or charcoal carrying more or less ash.

In the accompanying illustration I have shown, more or less diagrammatically, a generalized type of structure adapted for use in various embodiments of my invention.

In this showing, element 1 is a reaction chamber which may be of any convenient size or form or material. As shown, it is a simple iron cylinder provided with dumping means 2, filling hopper 3 at the top and pyrometer 4. As shown it has no means for external heating and is covered with a thick layer of heat insulating material 5, of any convenient kind. Within this chamber is a granular body of reaction material. Presuming that I use cobalt with a little alkali, say 10 per cent, the cobalt may be dissolved in water as a suitable oxygen-containing salt, together with an alkali salt, and the solution taken up on a granular carrier of any convenient kind. In order to avoid slagging difficulties, this carrier is best a basic refractory material such as double burnt magnesite or double burnt dolomite; materials which are commercially available and often used for lining basic open hearth furnaces. The impregnated carrier may be dried and charged into the reaction chamber. Near the top of the reaction chamber is a heat insulated conduit 6 leading exit gases through heat interchanger 7. As shown, this heat interchanger which serves to cool outflowing gases and preheat inflowing gases is composed of a metal cylinder with two cross-headers 8 and 9. Vertical tubes 11 connect the space above the top cross-header with the space below the lower cross-header. Efflux gases going through these tubes into the chamber below the lower cross-header are cooled. From this chamber the gases go through conduit 12 to a series of steam jacketed absorbers (three are shown) in which nitrogen compounds are taken up by sulfuric acid. Passing through the absorbers the gases are taken by conduit 13 to fan or blower 14. On the pressure side of this pump is conduit 14' returning the scrubbed gases to the reaction chamber through the preheater already mentioned; the gases going around the tubes between the cross-headers. From this preheater the gases are taken by conduit 15 passing through a suitable fire chamber in which they may be given such further heating as may be necessary. It is convenient to effect this further heating by bleeding off a little of the gases through connection 16 and burning it around the tube carrying the rest of the gases. Beyond this preheater a little steam may be introduced through pipe 17. A trap connection 18 may be used to return any condensate in the preheater to the gases going to the reaction chamber. The absorber is, as stated, steam heated to prevent too much condensation of water vapor in it. Through it flows sulfuric acid which absorbs HCN and $NH_3$ to form ammonium sulfate. The concentrated solution of ammonium sulfate may be delivered to outlet 19. As so far described it will be noted that the gases go in cyclic circuit through the reaction chamber, heat interchangers and absorbing chambers. In each pass however the gas will be somewhat exhausted of nitrogen and somewhat enriched in carbon oxids. Its content of $CO_2$ becomes progressively higher. In each pass therefore a portion of the gas is removed on the pressure side of the blower mentioned by conduit 20. A portion of the gas may be sent to any suitable place of use through valved outlet 21. The residue is sent through drier 22 which contains sulfuric acid. The sulfuric acid from this chamber may be led through conduit 23 to the absorbers before described. The dry gas is taken by conduit 24 and blower 25 into the base of an ordinary gas producer 26. This gas producer is provided with another blower 27 and outlet 28 for blowing up from time to time in the manner usual in making water gas. Presuming the gas producer is at the proper high temperature the portion of the gas current led through it is reduced with conversion of $CO_2$ into CO and is removed from the producer by conduit 29 and sent back to join the gas circulation through the reaction chamber. Such nitrogen as may be required to replenish the supply thereof is furnished by operating the air blower simultaneously. With both gas and air going through the producer, the air serves to furnish some portion of the heat required for the reduction of the gas.

The above structure enables me to obtain any desired or predetermined relation between the CO, the $CO_2$, the $N_2$ and the $H_2O$ in the gas current going through the reaction chamber. As stated, the portion of the gas stream going in cyclic circulation through the reaction chamber and the absorber is impoverished in nitrogen and enriched in $CO_2$ in each pass. On the other hand the portion of the gas sent through the producer has its $CO_2$ reduced to CO and it is here joined by nitrogen. Obviously by regulating the proportions between the gas current kept in cyclic circulation and the portion sent through the producer the ratio of CO to $CO_2$ may be made as desired and by continuing the process the amount of nitrogen becomes steadily diminished. On the other hand, with the use of the air fan the amount of nitrogen can be raised. With this apparatus therefore there is the possibility of the adjustment of three of the variables. The remaining one, the amount of water vapor, is regulated by the amount of steam blown in. Some of the water is consumed in furnishing hydrogen for the ammonia, some is removed with the solution of ammonium sulfate and the rest circulates, steam being supplied to make up the deficit. The absorbers being run hot, the amount of condensation therein is readily regulated. Such water vapor as passes forward with the gas current diverted to the producer is taken up by the sulfuric acid used for drying and returned to the absorbers with the acid. Drying the portion of gases sent through the producer with sulfuric acid is for the reason that I do not ordinarily desire any molecular hydrogen, $H_2$, in my gas mixture. It does no harm but it is an inert diluent.

I ordinarily aim, in this embodiment of my process, to keep enough $CO_2$ in the current going through the reaction chamber to prevent the development of any notable amount of solid carbon and prevent clogging up the catalyst. If the chamber should soot up, the deposited carbon can be burnt out from time to time by discontinuing the operation and blowing air through the reaction chamber by means of inlet 30, waste gases going to exit through 3. The mixture of metal and carbon ordinarily takes fire as soon as the air strikes it.

In this embodiment of my invention, I ordinarily run the temperature of the reaction chamber at about 400° C. Using cobalt this results in the development of much HCN, which, however is absorbed by sulfuric acid to form ammonium sulfate. As the cobalt is continually reduced and reoxidized by the CO and $CO_2$, it remains active for an indefinite period. In each reduction it appears in the nascent state with a high affinity for nitrogen and carbon. The gas mixture may have any desired ratio of the four active bodies CO, $CO_2$, $H_2O$ and $N_2$, but with cobalt as a catalyst in the present embodiment of my invention I ordinarily have about 80 per cent by volume of CO and $CO_2$ together with slightly more $CO_2$ than CO (to repress sooting up) and about 12 to 15 per cent $N_2$ with the residue water vapor. The apparatus is started with ordinary producer gas and the circulating gas mass built up to the desired composition. The alkali used with the cobalt may be potash, baryta, lithia or thallium oxid. Soda is not as well adapted but may be used.

Using iron in lieu of cobalt, the amount of carbon dioxid and water vapor should be raised. With nickel, the amount of water vapor should be cut down as low as possible to prevent formation of hydrocarbons from the nascent carbon and nascent hydrogen.

It is better to use charcoal in the producer as this furnishes a pure gas; but if coke or coal be employed the usual purifying train (not shown) may be placed in circuit to remove sulfur, etc. However, the catalyst in the present invention is not particularly sensitive to "catalyst poisons," such as sulfur, since it is continually being oxidized and reduced.

Compound catalysts may be used. Admixture of a little copper with the cobalt, nickel or iron is, for example, often useful.

In the described use of the apparatus shown for continuous operation, the circulating gas mass contains large amounts of carbon dioxid to control the reaction and also contains water vapor. In another and discontinuous method of operation, the gas mass and the water vapor are used alternately. In so operating in the cyaniding stage, the main circulation is through the producer and the amount of $CO_2$ is kept at a minimum. Presuming reaction chamber 1 to be comparatively cool as a result of steaming, dry gas rich in carbon monoxid is passed in with the result of depositing solid carbon and developing heat. As the temperature goes up, this carbon and the alkali react to form cyanid. When the desired amount of cyanid has formed, the introduction of gas is stopped, wholly or partially, and steam is blown through, breaking up the cyanid to form ammonia which is caught by the acid. The cooled residual matter is again treated with gas; and so on.

In this latter method of operation since the carbon is formed by catalysis from a gas it carries no ash to contaminate the alkali; and the same alkali may be used over again indefinitely without removing it from the reaction chamber. Since the amount of cyanid formed in a cycle depends upon the amount of alkali present, I ordinarily use as much alkali as the refractory material will take up without slagging. Thallium oxid permits work at lower temperatures than do potash or baryta. Lithia is a good alkali.

What I claim is:—

1. The process of fixing nitrogen which comprises exposing a mixture of gases containing carbon monoxid and nitrogen to the action of a heated catalyst capable of decomposing such carbon monoxid, producing volatile nitrogen compounds with the aid of water vapor and passing gases carrying such compounds through sulfuric acid to absorb said nitrogen compounds.

2. The process of fixing nitrogen which comprises exposing a mixture of gases containing carbon monoxid, nitrogen and water vapor to the action of a heated catylist capable of decomposing such carbon monoxid and passing the treated gases through sulfuric acid to absorb nitrogen compounds.

3. The process of fixing nitrogen which comprises exposing a mixture of gases containing carbon monoxid, carbon dioxid and nitrogen to the action of a heated catalyst capable of decomposing such carbon monoxid, producing volatile nitrogen compounds with the aid of water vapor and passing gases carrying such compounds through sulfuric acid to absorb said nitrogen compounds.

4. The process of fixing nitrogen which comprises exposing a mixture of gases containing carbon monoxid, carbon dioxid, nitrogen and water vapor to the action of a heated catalyst capable of decomposing such carbon monoxide and passing the treated gases through sulfuric acid to absorb nitrogen compounds.

5. The process of fixing nitrogen which comprises establishing and maintaining a cyclic circulation of gases comprising carbon monoxid and nitrogen through a heated gas producer and a reaction chamber containing finely divided carbon-monoxid-decomposing catalyst and exposing said catalyst to the action of water vapor.

6. The process of fixing nitrogen which comprises establishing and maintaining a cyclic circulation of gases comprising carbon monoxid and nitrogen through a heated gas producer and a reaction chamber containing finely divided cobalt and exposing said catalyst to the action of water vapor.

7. In the fixation of nitrogen, the process which comprises contacting a hot mass of gases comprising carbon monoxid, carbon dioxid and nitrogen with a catalyst capable of breaking down carbon monoxid, the carbon dioxid being present in sufficient amount to prevent any substantial formation of free carbon.

8. In the fixation of nitrogen, the process which comprises contacting a hot mass of gases comprising carbon monoxid, carbon dioxid, nitrogen and water with a catalyst capable of breaking down carbon monoxid, the carbon dioxid being present in sufficient amount to prevent substantial formation of free carbon or free hydrogen.

9. In the fixation of nitrogen, the process which comprises exposing a mixture of alkali and cobalt to the action of a hot gas mass comprising carbon monoxid and nitrogen.

10. In the fixation of nitrogen, the process which comprises exposing a mixture of nitrogen with carbon monoxid and water vapor to the action of a hot catalyst capable of producing nascent hydrogen in such mixture.

In testimony whereof, I affix my signature hereto.

K. P. McELROY.